United States Patent [19]
Kamikado

[11] Patent Number: 5,354,789
[45] Date of Patent: Oct. 11, 1994

[54] AQUEOUS RESIN DISPERSIONS

[75] Inventor: Koji Kamikado, Yokohama, Japan

[73] Assignee: Kansai Paint Co., Ltd., Hyogo, Japan

[21] Appl. No.: 985,217

[22] Filed: Dec. 3, 1992

[30] Foreign Application Priority Data

Dec. 5, 1991 [JP] Japan .................. 3-348431

[51] Int. Cl.$^5$ .................. C08K 3/20; C08L 63/02
[52] U.S. Cl. .................. 523/420; 428/418; 204/181.4; 204/181.7
[58] Field of Search .................. 523/420; 428/418; 204/181.4, 181.7

[56] References Cited

U.S. PATENT DOCUMENTS 3,899,535 8/1975 Brown et al. .................. 564/374
4,977,203 12/1990 Kitabatake .................. 523/417

FOREIGN PATENT DOCUMENTS 2158033 6/1973 France .
2620124 3/1989 France .

*Primary Examiner*—Melvyn I. Marquis
*Assistant Examiner*—D. Aylward
*Attorney, Agent, or Firm*—Wenderoth, Lind & Ponack

[57] ABSTRACT

An aqueous resin dispersion containing as an aqueous resin component a polyamide-modified epoxy-polyamine resin comprising a reaction product of a phenolic hydroxyl group-terminated polyamide compound obtained by the reaction of a polyamine compound containing at least two primary and/or secondary amino groups in a molecule and having a number average molecular weight of 40 to 8,000, a polycarboxylic acid having a number average molecular weight of 100 to 8,000 and a compound containing at least one phenolic hydroxyl group and one carboxyl group in a molecule, a bisphenol compound and a bisphenol diglycidyl ether compound, and an active hydrogen-containing amine compound. Said aqueous resin dispersion is excellent in corrosion resistance and especially suited for use in cathodic electrodeposition coating.

27 Claims, No Drawings

AQUEOUS RESIN DISPERSIONS

This invention relates to a novel aqueous resin dispersion, and more specifically to an aqueous resin dispersion having improved corrosion resistance and especially suited for cathodic electrodeposition coating.

As a resin composition used in an aqueous resin dispersion for use in a cathodic electrodeposition paint, a resin composition comprising a combination of an epoxypolyamine resin obtained by the reaction of an epoxy group-containing resin and a polyamine and a polyisocyanate curing agent blocked with an alcohol has been so far common as disclosed in, e.g., U.S. Pat. No. 3,922,253 (Japanese Laid-open Patent Application No. 93024/1979). As the epoxy group-containing resin, bisphenol A diglycidyl ether rendered high-molecular-weight with bisphenol A has been commonly used from the aspect of corrosion resistance. Moreover, epoxy resins plasticized by introducing therein a modifying agent such as partially soft polyesters, polyethers, polyamides, polybutadiene, a butadiene-acrylonitrile copolymer, etc. have been also put to practical use.

Development of paints having high corrosion resistance has been increasingly demanded from the standpoint of performance of a coated film in the field of electrodeposition coating of automobile bodies or parts in lower portions.

To meet the demands, when the amount of the modifier for plasticization incorporated so far in the epoxy resin is decreased to impart high corrosion resistance in cathodic electrodeposition coating, corrosion resistance is indeed increased, but flexibility and smoothness of a coated surface become poor.

Accordingly, the present inventors have made assiduous investigations to form a resin composition for use in an aqueous resin dispersion which has high corrosion resistance and gives flexibility of a coated film and smoothness of a coated surface. As a result, they have found that the above object can be achieved by using a specific epoxy-polyamine resin with a polyamide as a modifier, and have completed this invention.

Thus, according to this invention, there is provided an aqueous resin dispersion containing as an aqueous resin component a polyamide-modified epoxy-polyamine resin comprising a reaction product of (A) a phenolic hydroxyl group-terminated polyamide compound obtained by the reaction of
 (a) a polyamine compound containing at least two primary and/or secondary amino groups in a molecule and having a number average molecular weight of 40 to 8,000,
 (b) a polycarboxylic acid having a number average molecular weight of 100 to 8,000, and
 (c) a compound containing at least one phenolic hydroxyl group and one carboxyl group in a molecule,
(B) a bisphenol compound,
(C) a bisphenol diglycidyl ether compound, and
(D) an active hydrogen-containing amine compound.

The aqueous resin dispersion of this invention will be described in more detail below.

Phenolic hydroxyl group-terminated polyamide compound (A)

The phenolic hydroxyl group-terminated polyamide compound (A) used in this invention is obtained by the reaction of the polyamine compound (a) containing at least two primary and/or secondary amino groups in the molecule and having the number average molecular weight of 40 to 8,000, the polycarboxylic acid (b) having the number average molecular weight of 100 to 8,000, and the compound (c) containing at least one phenolic hydroxyl group and one carboxyl group in the molecule.

The polyamine compound (a) includes aliphatic, alicyclic, araliphatic or heterocyclic compounds containing at least two, preferably two to three amino groups selected from primary amino groups and secondary amino groups; the number average molecular weight thereof can be 40 to 8,000, preferably 40 to 4,000, more preferably 40 to 1,000.

Examples of the polyamine compound (a) are piperazine, ethylenediamine, ethylaminoethylamine, 1,1-diaminopropane, 1,3-diaminopropane, ethylaminopropylamine, hexamethylenediamine, 2-methylpentamethylenediamine, 2-hydroxyethylaminopropylamine, 1,4-diaminobutane, laurylaminopropylamine, m-xylylenediamine, 1,3-bis(aminomethyl)cyclohexane, isophorone diamine, bis(3-aminopropyl)ether, 1,3-bis(3-aminopropoxy)-2,2-dimethylpropane, diethylenetriamine, and polyoxyalkylenepolyamine. They may be used either singly or in combination.

Of these polyamine compounds, piperazine, ethylenediamine, ethylaminoethylamine, hexamethylenediamine, and isophoronediamine are especially preferable.

The polycarboxylic acid (b) includes aliphatic, alicyclic, aromatic and araliphatic compounds having at least two, preferably two to three carboxyl groups in a molecule; the number average molecular weight thereof can be 100 to 8,000, preferably 100 to 4,000, more preferably 100 to 1,000.

Examples of the polycarboxylic acid (b) are adipic acid, pimelic acid, suberic acid, azelaic acid, sebacic acid, undecandioic acid, dodecandioic acid, dimer acid, 1,1-cyclopropanedicarboxylic acid, phthalic acid, isophthalic acid, terephthalic acid, 1,2-naphthalenedicarboxylic acid, 2,2'-bibenzyldicarboxylic acid, and 4,4'-isopropylidenedibenzoic acid. They may be used either singly or in combination.

Among the above polycarboxylic acids, adipic acid, azelaic acid, sebacic acid and dimer acid are especially preferable.

Further, the compound (c) containing at least one phenolic hydroxyl group and one carboxyl group in the molecule can contain at least one, preferably one to two phenolic hydroxyl groups, i.e., hydroxyl groups directly bound to the aromatic ring; the carboxyl group present may be bound to the aromatic ring either directly or via an open chain. Such a compound (c) can have a number average molecular weight of usually 100 to 5,000, preferably 100 to 3,000, more preferably 100 to 2,000.

The compound (c) containing the phenolic hydroxyl group and the carboxyl group includes compounds represented by the following formulas.

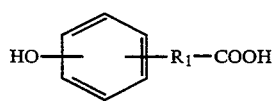

(I)

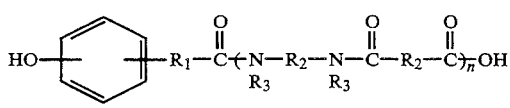

$$\text{(II)}$$

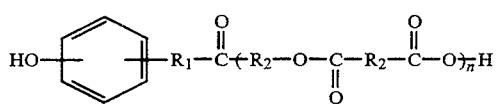

$$\text{(III)}$$

wherein $R^1$ denotes a direct bond or a $C_{1-20}$ hydrocarbon group, especially a $C_{1-18}$ hydrocarbon group, $R^2$'s are the same or different and each denotes a $C_{1-22}$ hydrocarbon group, especially a $C_{1-10}$ hydrocarbon group, $R^3$ is a hydrogen atom or a $C_{1-22}$ hydrocarbon group, especially a $C_{1-10}$ hydrocarbon group, and n is an integer of 1 to 10.

Examples of the compound (c) are hydroxybenzoic acid, hydroxyphenylacetic acid, hydroxyphenylpropionic acid, and hydroxyphenylstearic acid. Of these, hydroxyphenylpropionic acid and hydroxyphenylstearic acid are especially preferable.

The phenolic hydroxyl group-terminated polyamide compound (A) can be formed by, for example, (i) mixing the aforesaid three components (a), (b) and (c) and conducting the reaction, or (ii) previously reacting the components (a) and (b) to form polyamidoamine and then reacting the polyamidoamine with the component (c).

Of the above two methods (i) and (ii), the latter (ii) is preferable. To be concrete, the phenolic hydroxyl group-terminated polyamide compound (A) can be produced by mixing the polyamine compound (a) with the polycarboxylic acid (b) at such a ratio that the amount of the carboxyl group of the polycarboxylic acid (b) is 1 equivalent or less, preferably 0.70 to 0.98 equivalent per equivalent of the amino group of the compound (a), conducting the reaction until an unreacted carboxyl group substantially disappears to form polyamidoamine containing a primary or secondary amino group, and then reacting the polyamidoamine with the compound (c) at such a ratio that the amount of the carboxyl group of the compound (c) is 1 eqiuvalent or more, preferably about 1.0 to 1.1 equivalents per equivalent of the amino group of the polyamidoamine, and conducting the reaction such that an unreacted amino group substantially disappears.

The amounts of the three components (a), (b) and (c) used to produce the aforesaid phenolic hydroxyl group-terminated polyamide compound (A) are not strictly limited and can vary over a wide range depending on usage of the final product, properties required thereof, etc. For example, the following ranges can be taken on the basis of the total weight of the three components (a), (b) and (c).

Polyamine compound (a): usually 5 to 90% by weight, preferably 10 to 60% by weight, more preferably 10 to 40% by weight Polycarboxylic acid (b): usually 0 to 80% by weight, preferably 20 to 60% by weight, more preferably 30 to 50% by weight Phenolic hydroxyl group-containing compound (c): usually 10 to 90% by weight, preferably 30 to 70% by weight, more preferably 30 to 60% by weight The thus formed phenolic hydroxyl group-terminated polyamide compound (A) can have a number average molecular weight of usually 400 to 10,000, preferably 600 to 6,000, more preferably 1,000 to 4,000, and can have a phenolic hydroxyl group equivalent of usually 100 to 5,000, preferably 200 to 3,000, more preferably 400 to 2,000.

Bisphenol compound (B)

The bisphenol compound (B) includes a compound represented by formula (IV)

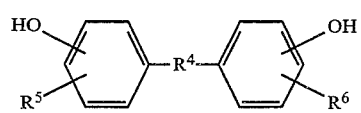

$$\text{(IV)}$$

wherein $R^4$ denotes

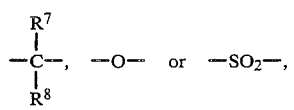

$R^7$ and $R^8$ each denote a hydrogen atom or a linear or branched $C_{1-10}$ alkyl group, and $R^5$ and $R^6$ each denote a hydrogen atom or a linear or branched $C_{1-3}$ alkyl group.

Examples of the bisphenol compound (B) are bis(4-hydroxyphenyl-2,2-propane (bisphenol A), bis(4-hydroxyphenyl)-1,1-ethane, bis(4-hydroxyphenyl)methane (bisphenol F), 4,4'-dihydroxydiphenyl ether, 4,4'-dihydroxydiphenylsulfone, bis(4-hydroxyphenyl)-1,1-isobutane, and bis(4-hydroxy-3-tert-butylphenyl)-2,2-propane. Of these, bisphenol A, bisphenol F and 4,4'-dihydroxydiphenyl ether are preferable.

Bisphenol diglycidyl ether compound (C)

The bisphenol diglycidyl ether compound (C) includes a diglycidyl ether compound of the above bisphenol compound of formula (IV) or its epoxy ring opened polymer represented by formula (V)

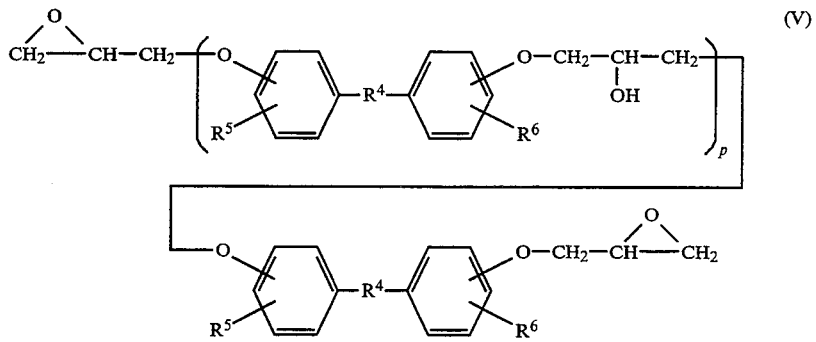

wherein $R^4$, $R^5$ and $R^6$ are as defined in formula (IV), and p is an integer of 0 to 10.

As the above bisphenol diglycidyl ether compound (C), bisphenol diglycidyl ether having a number average molecular weight of at least about 310, preferably about 320 to about 2,000, more preferably 320 to 1,000, and an epoxy equivalent of at least about 155, preferably about 160 to about 1,000, more preferably 160 to 500 is suitable. Especially, bisphenol A diglycidyl ether represented by the following formula is preferable from the aspects of flexibility and corrosion resistance.

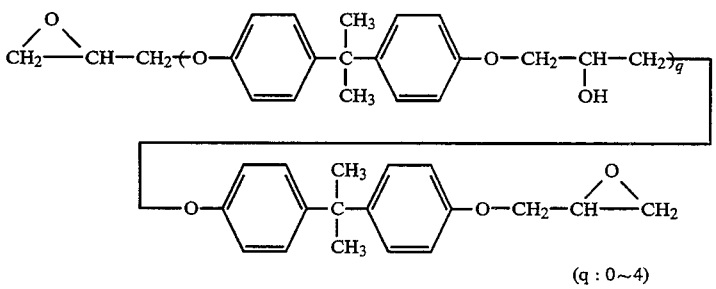

(q : 0~4)

Active hydrogen-containing amine compound (D)

The active hydrogen-containing amine compound (D) is an amine compound containing at least one active hydrogen and capable of reacting with an oxirane group, such as aliphatic, alicyclic and araliphatic, primary or secondary amines, alkanolamines and tertiary amine salts. The amine compound (D) helps introduce the amino group or the quaternary ammonium salt into the polyamide modified epoxy resin formed by the reaction of the three components (A), (B) and (C). Typical examples of the active hydrogen-containing amine compound are as follows.

(1) A compound obtained by converting a primary amino group of a polyamine compound containing one secondary amino group and one or more primary amino groups, such as diethylenetriamine, hydroxyethylaminoethylamine, ethylaminoethylamine, and methylaminopropylamine into aldimine, ketimine, oxazoline or imidazoline by heat-reacting with a ketone, an aldehyde or a carboxylic acid at a temperature of, e.g., about 100° to 230° C.

(2) A secondary monoamine such as diethylamine, diethanolamine, di-n- or di-iso-propanolamine, N-methylethanolamine, or N-ethylethanolamine.

(3) A secondary amine-containing compound obtained by adding a monoalkanolamine such as monoethanolamine and a dialkyl (meth)acrylamide by Michael addition reaction.

(4) A compound obtained by converting into ketimine a primary amino group of an alkanolamine such as monoethanolamine, diethylenetriamine, neopentanolamine, 2-aminopropanol, 3-aminopropanol, or 2-hydroxy-2'-(aminopropoxy)ethyl ether.

(5) A salt of a tertiary amine such as dimethylethanolamine, triethylamine, trimethylamine, triisopropylamine, or methyldiethanolamine.

Of the above amine compounds, diethanolamine, diethylamine, N-methylethanolamine, and N-ethylethanolamine are especially preferable.

Production of the polyamide-modified epoxy-polyamine resin

The polyamide-modified epoxy-polyamine resin of this invention (hereinafter referred to at times as a "resin of this invention") can be produced, for example, by reacting the phenolic hydroxyl group-terminated polyamide compound (A) with the bisphenol compound (B) and the bisphenol diglycidyl ether compound (C) to form a polyamide-modified epoxy resin and further adding the active hydrogen-containing amine compound (D).

The resin of this invention is produced, for example, by reacting the phenolic hydroxyl group-terminated polyamide compound (A) with more than 1 equivalent, per equivalent of the phenolic hydroxyl group, of the bisphenol diglycidyl ether compound (C), reacting the terminal oxirane group of the obtained resin with more than 1 equivalent, per equivalent of the oxirane group, of the bisphenol compound (B), and then adding the amine compound (D) to the terminal oxirane group of the obtained polyamide-modified epoxy resin. This method is especially desirous from the aspects of designing of the resin and controlling. The addition of the amine compound (D) can be conducted simultaneously with the formation of the polyamide-modified epoxy resin.

In producing the polyamide-modified epoxy resin by the reaction of the phenolic hydroxyl group-terminated polyamide compound (A), the bisphenol compound (B), and the bisphenol diglycidyl ether compound (C), the amount each of said compounds (A), (B) and (C) based on the total weight of said three components is as follows.

Component (A): usually 10 to 70% by weight, preferably 10 to 60% by weight, more preferably 15 to 60% by weight Component (B): usually 5 to 60% by weight, preferably 5 to 50% by weight, more preferably 5 to 40% by weight Component (C): usually 10 to 70% by weight, preferably 10 to 60% by weight, more preferably 10 to 50% by weight From the aspect of corrosion resistance, it is advisable that the obtained polyamide-modified epoxy resin has a number average molecular weight of usually 1,000 to 20,000, preferably 1,000 to 5,000.

The reaction of the compounds (A), (B) and (C) to obtain the polyamide-modified epoxy resin, i.e., the reaction of the oxirane group and the hydroxyl group, can be carried out in a manner known per se, for example, by heating, e.g., a tertiary amine such as triethylamine, tributylamine or dimethylbenzylamine, or a fluorinated boron compound such as boron trifluoride monoethylamine and zinc borofluoride at a temperature of about 40° to about 200° C. for about 1 to 15 hours in the presence of a catalyst.

The thus obtained polyamide-modified epoxy resin can then be converted into the polyamide-modified epoxy-polyamine resin of this invention by the addition of the active hydrogen-containing amine compound (D).

The polyamide-modified epoxy-polyamine resin of this invention can be formed by reacting the active hydrogen-containing amine compound (D) with the oxirane group of the polyamide-modified epoxy resin at a temperature of, e.g., about 30° to about 160° C. for about 1 to about 5 hours. Moreover, the addition of the amine compound (D) to the polyamide-modified epoxy resin can also be effected, as noted above, simultaneously with the production of the polyamide-modified epoxy resin.

The active hydrogen-containing amine compound (D) is used in such an amount that the amine value of the polyamide-modified epoxy-polyamine resin in this invention is usually 15 to 100, preferably 15 to 80, more preferably 20 to 60. The above polyamide-modified epoxypolyamine resin is reacted with a reaction reagent such as a tertiary amine salt, a monocarboxylic acid, a secondary sulfide salt, a monophenol or a monoalcohol so as to be able to improve control of water dispersibility or smoothness of a coated film.

Further, the polyamide-modified epoxy-polyamine resin of this invention can have internal crosslinkability by introducing therein a crosslinkable functional group such as a blocked isocyanate group, a beta-hydroxycarbamic acid ester group, an alpha,beta-unsatuated carbonyl group, or an N-methylol group.

The reaction with the reaction reagent and the introduction of the crosslinkable functional group may be carried out before adding the active hydrogen-containing amine compound (D) into the polyamide-modified epoxy resin.

The thus obtained polyamide-modified epoxypolyamine resin can be used conjointly with an external crosslinking agent. Said external crosslinking agent can be a compound containing two or more crosslinkable groups in a molecule, such as a blocked polyisocyanate, a polyamine beta-hydroxycarbamic acid ester, a malic acid ester derivative, a methylolated melamine, and a methylolated urea. The polyamide-modified epoxypolyamine resin/external crosslinking agent mixing ratio (as a solids content) is usually 100/0 to 60/40, preferably 95/5 to 65/35.

In order to prepare the aqueous resin dispersion, the polyamide-modified epoxy-polyamine resin of this invention can be water-solubilized or water-dispersed by protonating at least part of the amino groups of the resin with a water-soluble organic acid such as formic acid, acetic acid, or lactic acid.

The amount of the acid (neutralization value) used for protonation cannot strictly be defined. It is, however, usually about 5 to 40 KOH mg, preferably 10 to 20 KOH mg per gram of the resin solids content from the standpoint of electrodeposition characteristics. The thus obtained aqueous solution or aqueous dispersion is especially suited for cathodic electrodeposition coating. On this occasion, a pigment, a solvent, a curing catalyst, and a surface active agent can be used if required.

As a method and an apparatus for electrodeposition on a product being coated using the aqueous resin dispersion of this invention, a method and a device known per se in cathodic electrodeposition coating are available. At that time, it is advisable to use the product being coated as a cathodic and a stainless steel or carbon plate as an anode. The electrodeposition coating conditions are not particularly limited. Generally, it is desirable to conduct electrodeposition coating with stirring under conditions of a bath temperature : 20°–30° C., a voltage: 100–400 V (preferably 200–300 V), a current density: 0.01–3 A/dm$^2$, a time of passing electricity: 1–5 minutes, a pole area ratio (A/C): 2/1–1/2, and a pole distance: 10–100 cm.

The coated film deposited on the cathodic coated product can be, after washing, cured by baking at a temperature of, e.g., about 140° to about 180° C.

The aqueous resin dispersion of this invention can form a coated film excellent in flexibility and appearance without decrease in corrosion resistance of the epoxy resin because in the epoxy resin using the phenolic hydroxyl group-terminated polyamide compound, part of the main chain of the resin is bound with a molecular chain made of a specific component having a polyamide bond.

The following Examples illustrate this invention more specifically. In said Examples, "%" is all by weight.

PRODUCTION EXAMPLE 1

A flask fitted with a stirrer, a thermometer, a nitrogen introduction tube and a reflux condenser was charged with 316 g of 2-methylpentamethylenediamine, 964 g of dimer acid (an acid value 200) and 110 g of xylene. While blowing a nitrogen gas, the mixture was dehydrated at 230° C. under reflux. The reaction was run until the amount of dehydration became 62 g. Then, 818 g of hydroxyphenylstearic acid (an acid value 137) was added, and the reaction was conducted at 230° C. When the amount of dehydration reached 36 g, xylene was removed under reduced pressure, and the residue was diluted with 857 g of ethylene glycol monobutyl ether and cooled. There resulted a phenolic hydroxyl group-terminated polyamide compound (A-1) having a solids content of 70% and a phenolic hydroxyl equivalent of 1,000.

Then, to 643 g of the phenolic hydroxyl group-terminated polyamide compound (A-1) were added 1,335 g of bisphenol diglycidyl ether having an epoxy equivalent of 190 and 21 g of diethanolamine. The reaction was run at 110° C. until the concentration of the epoxy group reached 3.19 mmols/g. Further, 521 g of bisphenol A was added and the reaction was conducted until the concentration of the epoxy group reached 0.714 mmol/g. Subsequently, the reaction mixture was diluted with 512.3 g of ethylene glycol monobutyl ether and cooled. When the temperature became 90° C., 173 g of diethanolamine was added, and the reaction was conducted at 90° C. until the epoxy group disappeared. There resulted a polyamide-modified epoxy-polyamine resin (B-1) having a solids content of 78%, a primary hydroxyl equivalent of 676, and an amine value of 41.5.

PRODUCTION EXAMPLE 2

The same reaction vessel as used in Production Example 1 was charged with 359 g of m-xylylenediamine, 918 g of dimer acid (an acid value 200) and 110 g of xylene. While blowing a nitrogen gas, dehydration was conducted under reflux at 230° C. After the reaction was conducted until the amount of dehydration reached 59 g, 818 g of hydroxyphenylstearic acid (an acid value 137) was added, and the reaction was run at 230° C. When the amount of dehydration became 36 g, xylene was removed under reduced pressure, and the residue was diluted with 857 g of ethylene glycol monobutyl ether and cooled to obtain a phenolic hydroxyl group-terminated polyamide compound (A-2) having a solids content of 70% and a phenolic hydroxyl equivalent of 1,000.

Subsequently, 1,335 g of bisphenol diglycidyl ether having an epoxy equivalent of 190 g and 21 g of diethanolamine were added to 643 g of the phenolic hydroxyl group-terminated polyamide compound (A-2), and the reaction was run at 110° C. until the concentration of the epoxy group reached 3.19 mmols/g. Bisphenol A (521 g) was added and the reaction was run at 110° C. until the concentration of the epoxy group became 0.714 mmol/g. Then, the reaction mixture was diluted with 512.3 g of ethylene glycol monobutyl ether and cooled. When the temperature reached 90° C., 173 g of diethanolamine was added, and the reaction was run until the epoxy group disappeared. There resulted a polyamide-modified epoxypolyamine resin (B-2) having a solids content of 78%, a primary hydroxyl equivalent of 676 and an amine value of 41.5.

PRODUCTION EXAMPLE 3

The same reaction vessel as used in Production Example 1 was charged with 447 g of m-xylylenediamine, 639 g of dimer acid (an acid value 200), 215 g of azelaic acid and 110 g of xylene. While blowing a nitrogen gas, dehydration was conducted under reflux at 230° C. The reaction was run until the amount of dehydration reached 82 g. Then, 818 g of hydroxyphenylstearic acid (an acid value 137) was added, and the reaction was run at 230° C. When the amount of dehydration reached 37 g, xylene was removed under reduced pressure, and the residue was diluted with 857 g of ethylene glycol monobutyl ether and cooled. There resulted a phenolic hydroxyl group-terminated polyamide compound (A-3) having a solids content of 70% and a phenolic hydroxyl equivalent of 1,000.

Subsequently, 1,335 g of bisphenol diglycidyl ether having an epoxy equivalent of 190 and 21 g of diethanolamine were added to 643 g of the phenolic hydroxyl group-terminated polyamide compound (A-3), and the reaction was run at 110° C. until the concentration of the epoxy group reached 3.19 mmols/g. Bisphenol A (521 g) was added, and the reaction was conducted at 110° C. until the concentration of the epoxy group reached 0.714 mmol/g. The reaction mixture was diluted with 512.3 g of ethylene glycol monobutyl ether and cooled. When the temperature became 90° C., 173 g of diethanolamine was added, and the reaction was run until the epoxy group disappeared. There resulted a polyamide-modified epoxy-polyamine resin (B-3) having a solids content of 78%, a primary hydroxyl equivalent of 676 and an amine value of 1.5.

PRODUCTION EXAMPLE 4

The same reaction vessel as used in Production Example 1 was charged with 1,272.6 g of bisphenol A diglycidyl ether having an epoxy equivalent of 190, 535.8 g of bisphenol A, 21 g of diethanolamine and 150 g of methyl isobutyl ketone. The reaction was run at 110° C. until the concentration of the epoxy group became 0,909 mmol/g. The reaction mixture was then diluted with 415 g of ethylene glycol monobutyl ether. When the temperature reached 90° C., 173.3 g of diethanolamine was added, and the reaction was run until the epoxy group disappeared. There resulted an epoxy-polyamine resin (B-4) having a solids content of 78%, a primary hydroxyl equivalent of 541 and an amine value of 51.8.

PRODUCTION EXAMPLE 5

The same reaction vessel as used in Production Example 1 was charged with 425.3 g of polypropylene glycol diglycidyl ether (made by Tohto Kasei K. K., an epoxy equivalent 315), 1,222.1 g of bisphenol A diglycidyl ether having an epoxy equivalent of 190, 659.1 g of bisphenol A, 21 g of diethanolamine and 150 g of methyl isobutyl ketone. The reaction was run at 120° C. until the concentration of the epoxy group reached 0,727 mmol/g. Then, the reaction mixture was diluted with 555.2 g of ethylene glycol monobutyl ether and cooled. When the temperature became 90° C., 173.3 g of diethanolamine was added, and the reaction was run until the epoxy group disappeared. There resulted a modified epoxy-polyamine resin having a solids content of 78%, a primary hydroxyl equivalent of 676 and an amine value of 41.5.

EXAMPLES 1, 2 and 3 and COMPARATIVE EXAMPLES 1 and 2

Each of the five resin solutions obtained in Production Examples 1 to 5 was mixed with methyl ethyl ketoxime blocked isophorone diisocyanate such that the amount of the blocked isocyanate group was equivalent to that of the primary hydroxyl group of the epoxy-polyamine resin.

One gram of polypropylene glycol (molecular weight 4000), 1.82 g of acetic acid and 1 g of lead acetate were added to 100 g (as a solids content) of the above resin composition. While heating to 40° C. and stirring, deionized water was gradually added and the mixture was dispersed therein to obtain a stable emulsion having a resin solids content of 30%. To 100 g (as a resin solids content) of the thus obtained emulsion were added 3 g of basic lead silicate, 13 g of titanium white, 0.3 g of carbon, 3 g of clay, 2 g of dibutyltin oxide and 1 g of a nonionic surface active agent (Noigen 142B, a trademark for a product of Daiichi Kogyo Seiyaku Co., Ltd.). The pigments were dispersed with a ball mill until the particle size became 10 microns or less. Then, the dispersion was diluted with deionized water such that the resin solids content became 15%.

Using the above obtained five diluted paints, cationic electrodeposition coating was conducted on an untreated steel plate at a bath temperature of 28° C. and a voltage of 250 V for 3 minutes. These electrodeposition coated plates were baked at 160° C. for 20 minutes to obtain the baked coated panels. The test results of the coated panels are shown in Table 1.

The test methods in Table 1 are as follows.

*1 Impact resistance (du-Pont system)

The test plate was placed in a constant temperature/-constant humidity chamber having a temperature of 20±1° C. and a humidity of 75±2% for 24 hours. Then, a du-Pont impact tester was fitted with a receiving base of a prescribed size and a shock core. The test plate was held therebetween with the coated surface up. Thereafter, a load of a prescribed weight fell down on the shock core, and a maximum height at which crack and delamination owing to shock were not observed on the coated film was measured. *2 Bending resistance After the test plate was placed in a constant temperature/constant humidity chamber having a temperature of 20±1° C. and a humidity of 75±2% for 24 hours, 180° bending was conducted for 1 to 2 seconds. The results were evaluated as follows.

◯: No abnormality is found on the front and the back of the bent portion.

X: Abnormality such as crack, delamination, or the like is found on at least one of the front and the back of the bent portion.

*3 Salt spray resistance

Crosscuts were applied to the coated plate, and the test was run according to JIS Z2871. After 480 hours, the crosscut portion was peeled off with a cellophane adhesive tape, and the peeling width was measured.

(a) 5 to 90% by weight of a polyamine compound containing at least two primary and/or secondary amino groups in a molecule and having a number average molecular weight of 40 to 8,000, (b) 20 to 80% by weight of a polycarboxylic acid having a number average molecular weight of 100 to 8,000, and (c) 10 to 90% by weight of a compound containing at least one phenolic hydroxyl group and one carboxyl group in a molecule, (B) a bisphenol compound, (C) a bisphenol diglycidyl ether compound, and (D) an active hydrogen-containing amine compound.

2. The aqueous resin dispersion of claim 1 wherein the polyamine compound (a) is an aliphatic, alicyclic, araliphatic or heterocyclic compound containing two to three amino groups selected from primary and secondary amino groups.

3. The aqueous resin dispersion of claim 1 wherein the polyamine compound (a) has a number average molecular weight of 40 to 4,000.

4. The aqueous resin dispersion of claim 1 wherein the polyamine compound (a) is selected from the group consisting of piperazine, ethylenediamine, ethylaminoethylamine, 1,2-diaminopropane, 1,3-diaminopropane, ethylaminopropylamine, hexamethylenediamine, 2-ethylpentamethylenediamine, 2-hydroxyethylaminopropylamine, 1,4-diaminobutane, laurylaminopropylamine, m-xylylenediamine, 1,3-bis(aminomethyl)cyclohexane, isophoronediamine, bis(3-aminopropyl) ether, 1,3-bis(3-aminopropoxy)-2,2-dimethylpropane, diethylenetriamine and polyoxyalkylenepolyamine.

5. The aqueous resin dispersion of claim 1 wherein the polycarboxylic acid (b) is an aliphatic, alicyclic, aromatic or araliphatic compound containing two to three carboxyl groups in a molecule.

6. The aqueous resin dispersion of claim 1 wherein the polycarboxylic acid (b) has a number average molecular weight of 100 to 4,000.

7. The aqueous resin dispersion of claim 1 wherein the polycarboxylic acid (b) is selected from the group

TABLE 1

| | | Example | | | Comparative Example | |
|---|---|---|---|---|---|---|
| | | 1 | 2 | 3 | 1 | 2 |
| Basic resin | | | | | | |
| Type (production Example No.) | | B-1 (1) | B-2 (2) | B-3 (3) | B-4 (4) | B-5 (5) |
| Solids content (g) | | 77 | 77 | 77 | 77 | 77 |
| Curing agent | | | | | | |
| Methyl ethyl ketoxime blocked isophorone diisocyanate solids content (g) | | 23 | 23 | 23 | 23 | 23 |
| Properties of a coated film | | | | | | |
| Appearance | Visual, estimation | good | good | good | Pinhole occurs | good |
| Impact resistance*1 | du-Pont tester 500, ½ inch (cm) | 50< | 50< | 50< | 30 | 50< |
| Bending resistance*2 | Bending tester (10 mmφ) | ◯ | ◯ | ◯ | X | ◯ |
| Salt spray resistance*3 | | 0.4 | 0.5 | 0.2 | 1.0 | 5 or more |

What we claim is:

1. An aqueous resin dispersion containing as an aqueous resin component a polyamide-modified epoxypolyamine resin comprising a reaction product of (A) a phenolic hydroxyl group-terminated polyamide compound obtained by the reaction of, based on the total weight of (a), (b) and (c), consisting of adipic acid, pimelic acid, suberic acid, azelaic acid, sebacic acid, undecandioic acid, dodecandioic acid, dimer acid, 1,1-cyclopropanedicarboxylic acid, phthalic acid, isophthalic acid, terephthalic acid, 1,2-naphthalenedicarboxylic acid, 2,2'-bibenzyldicarboxylic acid and 4,4'-isopropylidenedibenzoic acid.

8. The aqueous resin dispersion of claim 1 wherein the compound (c) containing at least one phenolic hydroxyl group and one carboxyl group in the molecule has a number average molecular weight of 100 to 5,000.

9. The aqueous resin dispersion of claim 1 wherein the compound (c) containing at least one phenolic hydroxyl group and one carboxyl group in the molecule is selected from the group consisting of compounds represented by formula (I), (II) and (III)

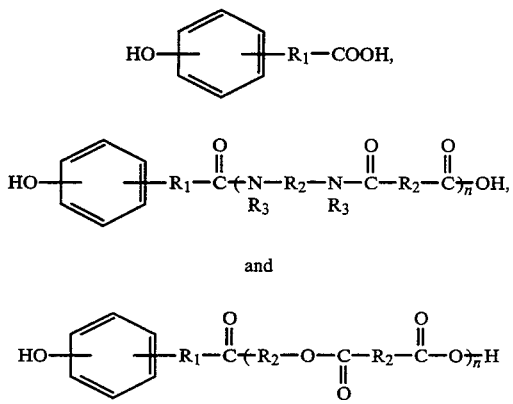

wherein $R^1$ denotes a direct bond or a $C_{1-20}$ hydrocarbon group, $R^2$'s are the same or different and each denotes a $C_{1-22}$ hydrocarbon group, $R^3$ denotes a hydrogen atom or a $C_{1-22}$ hydrocarbon group, and n is an integer of 1 to 10.

10. The aqueous resin dispersion of claim 9 wherein the compound (c) is selected from the group consisting of hydroxybenzoic acid, hydroxyphenylacetic acid, hydroxyphenylpropionic acid and hydroxyphenylstearic acid.

11. The aqueous resin dispersion of claim 1 wherein the phenolic hydroxyl group-terminated polyamide compound (A) is obtained by the reaction of, based on the total weight of the three components (a), (b) and (c), 20 to 60% by weight of the compound (a), 20 to 60% by weight of the compound (b) and 30 to 70% by weight of the compound (c).

12. The aqueous resin dispersion of claim 1 wherein the phenolic hydroxyl group-terminated polyamide compound (A) has a number average molecular weight of 400 to 10,000 and a phenolic hydroxyl equivalent of 100 to 5,000.

13. The aqueoous resin dispersion of claim 1 wherein the bisphenol compound (B) is a compound represented by formula (IV)

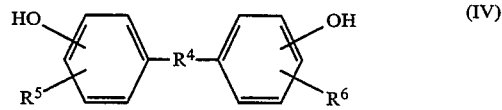

wherein $R^4$ denotes

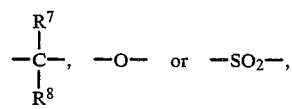

$R^7$ and $R^8$ each denote a hydrogen atom or a linear or branched $C_{1-10}$ alkyl group, and $R^5$ and $R^6$ each denote a hydrogen atom or a linear or branched $C_{1-3}$ alkyl group.

14. The aqueous resin dispersion of claim 1 wherein the bisphenol compound (B) is selected from the group consisting of bis(4-hydroxyphenyl)-2,2-propane (bisphenol A), bis(4-hydroxyphenyl)-1,1-ethane, bis(4-hydroxyphenyl)methane (bisphenol F), 4,4'-dihydroxydiphenyl ether, 4,4'-dihydroxydiphenylsulfone, bis(4-hydroxyphenylphenyl)-1,1-isobutane, and bis(4-hydroxy-3-tert-butylphenyl)-2,2-propane.

15. The aqueous resin dispersion of claim 1 wherein the bisphenol diglycidyl ether compound (C) is a compound represented by formula V

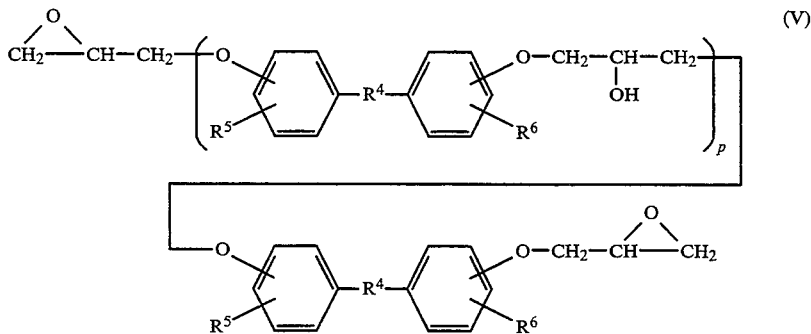

wherein $R^4$ denotes

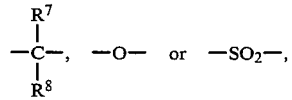

$R^7$ and $R^8$ each denote a hydrogen atom or a linear or branched $C_{1-10}$ alkyl group, $R^5$ and $R^6$ each denote a hydrogen atom or a linear or branched $C_{1-3}$ alkyl group, and p is an integer of 0 to 10.

16. The aqueous resin dispersion of claim 1 wherein the bisphenol diglycidyl ether compound (C) has a number average molecular weight of 320 to 2,000 and an epoxy equivalent of 160 to 1,000.

17. The aqueous resin dispersion of claim 15 wherein the bisphenol diglycidyl ether compound (C) is bisphenol A diglycidyl ether represented by the following formula

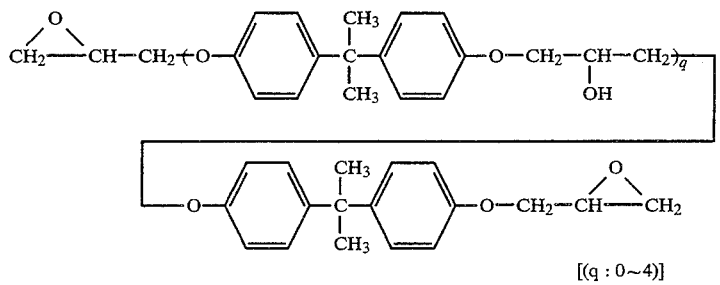

[(q : 0~4)]

in which g is a number of 0 to 4.

18. The aqueous resin dispersion of claim 1 wherein the amine compound (D) is selected from the group consisting of aliphatic, alicyclic and araliphatic, primary or secondary amines, alkanolamines and tertiary amines.

19. The aqueous resin dispersion of claim 1 wherein the amine compound (D) is diethanolamine, diethylamine, N-methylethanolamine or N-ethylethanolamine.

20. The aqueous resin dispersion of claim 1 wherein the polyamide-modified epoxy-polyamine resin is obtained by reacting the phenolic hydroxyl group-terminated polyamide compound (A) with the bisphenol compound (B) and the bisphenol diglycidyl ether compound (C), and adding the amine compound (D) to the formed polyamide-modified epoxy resin.

21. The aqueous resin dispersion of claim 20 wherein, based on the total weight of the three components (A), (B) and (C), 10 to 70% by weight of the compound (A), 5 to 60% by weight of the compound (B) and 10 to 70% by weight of the compound (C) are reacted.

22. The aqueous resin dispersion of claim 20 wherein the polyamide-modified epoxy resin has a number average molecular weight of 1,000 to 20,000.

23. The aqueous resin dispersion of claim 20 wherein the amine compound (D) is used in such an amount that the amine value of the formed polyamide-modified epoxypolyamine resin becomes 5 to 100.

24. The aqueous resin dispersion of claim 1 wherein the polyamide-modified polyepoxy-polyamine resin is water-solubilized or water-dispersed by treatment with a water-soluble organic acid.

25. The aqueous resin dispersion of claim 1 which is used for cathodic electrodeposition coating.

26. A paint for use in cathodic electrodeposition coating, comprising the aqueous resin dispersion of claim 1.

27. An article coated with the paint of claim 26.

* * * * *